E. O. RICHARDSON & F. E. BENNETT.
DAY AND NIGHT AUTOMOBILE SIGNAL.
APPLICATION FILED MAR. 30, 1915.
1,180,606.  Patented Apr. 25, 1916.
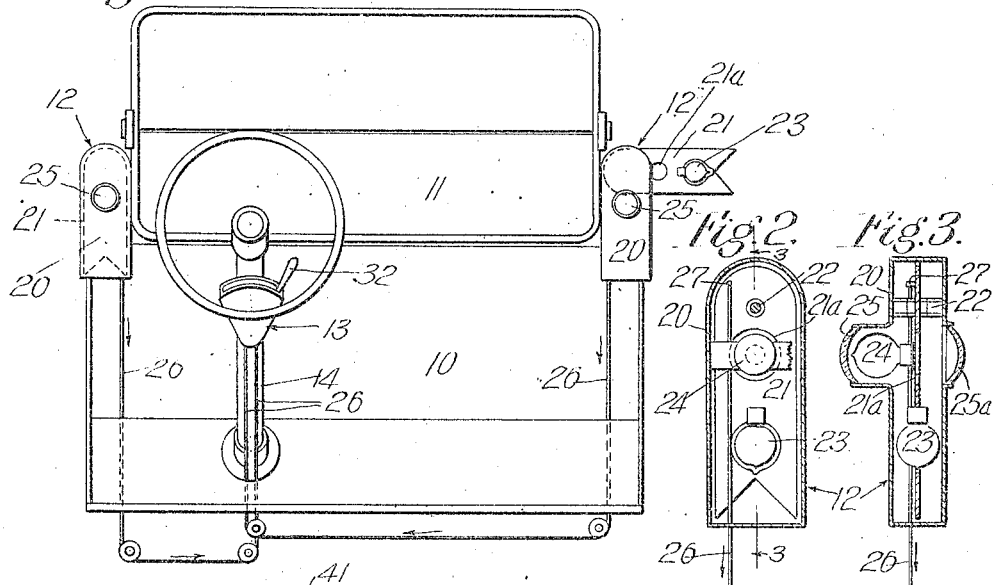
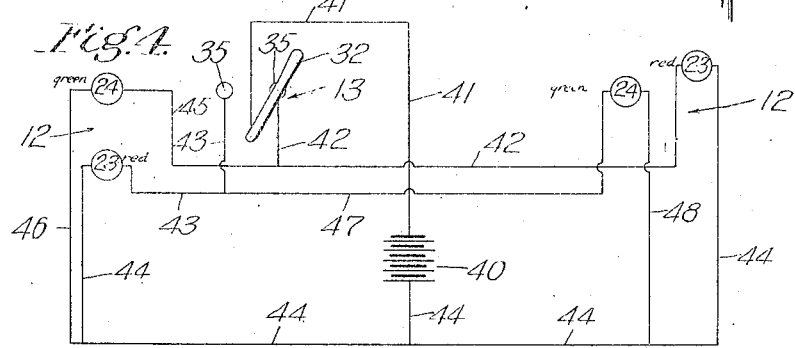
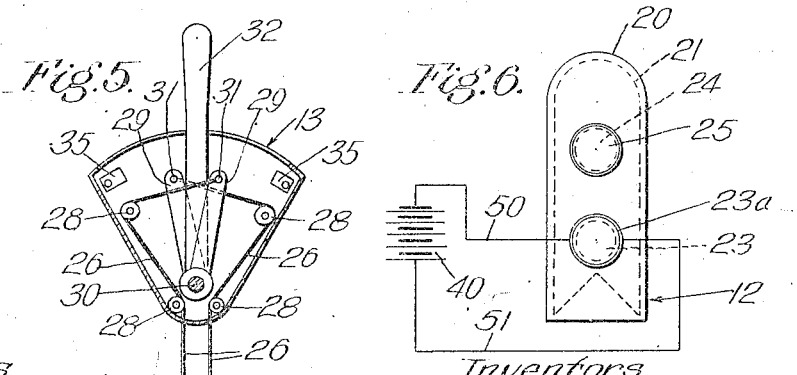
Witness
Elword H. Barkelow
Inventors
Fred E. Bennett and Edward O. Richardson
by James T. Barkelow
his Attorney.

UNITED STATES PATENT OFFICE.

EDWARD O. RICHARDSON, OF NEAR LOS ANGELES, AND FRED E. BENNETT, OF MONROVIA, CALIFORNIA.

DAY AND NIGHT AUTOMOBILE-SIGNAL.

1,180,606.

Specification of Letters Patent.

Patented Apr. 25, 1916.

Application filed March 30, 1915. Serial No. 18,042.

*To all whom it may concern:*

Be it known that we, EDWARD O. RICHARDSON and FRED E. BENNETT, citizens of the United States, residing near Los Angeles and at Monrovia, respectively, both in the county of Los Angeles, State of California, have invented new and useful Improvements in Day and Night Automobile-Signals, of which the following is a specification.

This invention relates to signals adapted particularly for use on automobiles and the like; and the primary object of this invention is the provision of a simple and effective mechanism for enabling the driver of an automobile to indicate the direction in which he is intending to turn from a straight course.

Our signal is, in its general aspect, one in which the operation is controlled manually; that is, by manual operation the driver may indicate the direction in which he is about to turn.

The primary features of our invention are contained in the combination of two signal devices which are placed one on each side of the automobile in any convenient position, either forward alongside the wind shield or at the rear of the two rear fenders, or in any other suitable position; and a central control device for controlling the action of the two side signal devices and causing them to act coöperatively.

Each of the side signal devices has a semaphore arm and two lights of distinctive color, as red and green; and the arrangement is such that when the driver moves the handle of the central controlling device he indicates a turn in a certain direction, say to the right, the semaphore arm in the signal device on that side will be turned horizontally and the red light on that side will be illuminated, and the green light on the other side will be simultaneously illuminated. When the signal devices are placed at the rear of the car, as on the rear fenders, we may provide means for showing the red light permanently in one of the signal devices, this red light thus becoming a tail light for the automobile as well as a signal light.

For the purpose of the following specification, we have illustrated a preferred form of our invention in the accompanying drawings, in which—

Figure 1 is an elevation showing our signal apparatus in place on an automobile, Fig. 2 is an enlarged vertical section of one of the side signal devices. Fig. 3 is a section of the same taken as indicated by line 3—3 on Fig. 2, Fig. 4 is a diagram illustrating the electrical connections of the apparatus, Fig. 5 is a section showing the construction of the central control mechanism, and Fig. 6 is a view showing a modified form of side signal device and illustrating diagrammatically the special electrical connection therefor.

In the drawing the numeral 10 may designate the body of an automobile, and 11 the wind shield thereof; 12 the two side signal devices and 13 the central control mechanism preferably mounted upon the steering post 14 of the automobile. As before stated, the two side signals 12 may be mounted in any convenient position upon the automobile; we have here shown them mounted at opposite sides of the wind shield. These side signal devices are each constructed as shown in detail in Figs. 2 and 3, each comprising a suitable casing 20 having a normally vertically hanging semaphore arm 21 therein, said semaphore arm being mounted upon a suitable pivot 22. A lamp 23 is carried in the semaphore arm, said lamp being preferably red in color. Mounted in the casing 20 and stationary therein, is a lamp 24 which is preferably green in color, a lens 25 in the casing covering the lamp in the manner illustrated. Provision may be made for making the green lamp visible from both front and rear. There may be an aperture 21ª in the semaphore arm 21 and a front lens 25ª placed opposite the lamp 24 and the opening 21ª. The red lamp 23 is not visible when the semaphore hangs in the casing; except in the modified form as shown in Fig. 6. A pull wire, or equivalent member, 26 connects with a semaphore arm 27, so that a pull upon the wire in the direction indicated will cause the semaphore arm to move outwardly to horizontal position as is indicated at the right in Fig. 1. When the semaphore arm is in this position the red lamp 23 is visible.

The two pull wires 26 extend to the central control mechanism 13, and after passing over pulleys 28, connect to a pair of arms 29 pivoted on a shaft 30 as shown in Fig. 5. These arms 29 have pivots 31 adapted to be engaged by the hand lever 32 when the lever is moved in one direction or the other, to the right or to the left. For instance, when the hand lever 32 is moved to the right in Fig. 1 and Fig. 5, it will engage with a pin 31 to the right in Fig. 5 and move the right hand arm 29 to the right and pull upon the pull wire 26 which runs to the right hand signal device 12, raising the semaphore arm 21 to the horizontal position as shown in Fig. 1. At the same time that the movement of the hand lever 32 causes the movement of the semaphore arm, it comes into electrical engagement with contact 35; and by virtue of such contact a circuit is completed to the red lamp 23 in the corresponding semaphore arm 21 and also is established to the green lamp 24 in the opposite signal device 12. When the handle 32 is moved toward the left in Fig. 5, it causes the operation of the pull wire 26 which extends to the left hand signal device 12, throwing the semaphore arm of that signal device outward to a horizontal position; and at the same time the hand lever 32 engages with the contact 35 to the left in Fig. 5, which engagement causes a closure of circuit to the red lamp of the left hand signal device signal and the green lamp of the right hand signal device 12.

The electrical connections by which the said circuits are effected are shown in Fig. 4. Any suitable source of electrical energy may be used, as a battery 40; and one wire 41 from the battery extends to the hand lever 32. From the two contacts 35 wires 42 and 43 extend, wire 42 leading directly to the right hand red lamp 23 and wire 43 leading directly to the left hand red lamp 23. Wires 44 lead from the two red lamps 23 back to the battery. A wire 45 connects with wire 42 and leads to the left hand green lamp 24, while a wire 46 connects between the left hand green lamp 24 and the wire 44 which returns to the battery 40. Similarly, a wire 47 connects with wire 43 and the right hand green lamp 24 and a wire 48 connects with the right hand green lamp 24 and the wire 44 which leads back to the battery. It will be seen that when the hand lever 32 moves to the position shown in Fig. 4 a circuit will be established through the wire 44, hand lever 32, contact 35, wire 42, lamp 23, and wire 44 back to the battery; and at the same time through wire 41, hand lever 32, contact 35, wire 42, wire 45, lamp 24, wire 46 and wire 44 back to the battery. This causes illumination of the red lamp on the right hand side and the green lamp on the left hand side. Similarly, when the hand lever 32 is thrown to the left in Fig. 4, circuits are established which cause the illumination of the left hand red lamp and the right hand green lamp. It will thus be seen that, when the hand lever 32 is thrown to the right, the right hand semaphore arm 21 will be raised and its red lamp will be illuminated, while the green lamp on the left hand side is illuminated; and that, similarly, when the hand lever 32 is thrown to the left, the left hand semaphore arm 21 will be raised and its red lamp illuminated, while the green lamp on the right hand side will be illuminated.

As hereinbefore stated, the signal devices 12 may be placed in any suitable position upon the automobile, one at one side and one at the other side; and where the devices are placed at the rear of the automobile we make provision for illuminating one of the red lamps 23 continuously so that said red lamp may serve as a tail light for the automobile. The arrangement for this purpose is shown in Fig. 6. In the form shown in the other figures, the red lamp 23 is out of sight when the semaphore arm is within the casing 20. In the form shown in Fig. 6, we provide an opening or lens 23ª over the lamp 23 when that lamp is in position in the casing; and we provide a circuit consisting of wires 50 and 51 leading from the battery 40 to the red lamp 23, so that this red lamp is continuously illuminated.

Having described a specific form of our invention, we claim:

1. An automobile signal, comprising in combination a pair of side signal devices and a central control mechanism, each of said side signals having a semaphore arm adapted to hang normally vertically, a red lamp set in said semaphore arm, and a green lamp stationary in said signal, and means controlled by said central control mechanism to raise either of said semaphore arms and to simultaneously illuminate the green lamp of the other signal device.

2. An automobile signal, comprising in combination a pair of side signal devices and a central control mechanism, each of said side signals having a semaphore arm normally hanging vertically, a red lamp in each of said semaphore arms and a green lamp stationary in each of said side signal devices, a control handle in the central control mechanism, mechanical connections between the control handle and the semaphore arms, and electrical switches coöperative with the control handle electrically connected with said green lamps, the arrangement being such that when the semaphore arm of one side signal device is raised the green lamp of the other side signal device is illuminated.

3. An automobile signal, comprising in combination a pair of side signal devices and a control mechanism, each of said side signal devices having a semaphore arm adapted to normally hang vertically, a red lamp set in said semaphore arm, a green lamp stationary in the signal device, and means controlled by said control mechanism to raise either of said semaphore arms toward a horizontal position to simultaneously illuminate the red lamp of the arm which is raised and the green lamp of the other signal device.

4. An automobile signal, comprising in combination a pair of side signal devices and a control mechanism, each of said side signal devices embodying two lamps of different distinctive colors and a semaphore arm; and means controlled by said control mechanism for moving either of said semaphore arms to signaling position, and to simultaneously illuminate one of said lamps in the signal device to which the operated semaphore belongs and to illuminate the lamp of other color in the other signal device.

In witness that we claim the foregoing we have hereunto subscribed our names this 18th day of March, 1915.

EDWARD O. RICHARDSON.
F. E. BENNETT.

Witnesses:
JAMES T. BARKELEW,
ELWOOD H. BARKELEW.